United States Patent
Mori et al.

(10) Patent No.: US 9,466,225 B2
(45) Date of Patent: Oct. 11, 2016

(54) SPEECH LEARNING APPARATUS AND METHOD

(71) Applicant: KABUSHIKI KAISHA TOSHIBA, Minato-ku, Tokyo (JP)

(72) Inventors: Kouichirou Mori, Saitama (JP); Masahiro Morita, Yokohama (JP)

(73) Assignee: Kabushiki Kaisha Tosihba, Minato-ku, Tokyo (JP)

( * ) Notice: Subject to any disclaimer, the term of this patent is extended or adjusted under 35 U.S.C. 154(b) by 212 days.

(21) Appl. No.: 13/966,927

(22) Filed: Aug. 14, 2013

(65) Prior Publication Data

US 2014/0051042 A1    Feb. 20, 2014

(30) Foreign Application Priority Data

Aug. 16, 2012 (JP) .................. 2012-180447

(51) Int. Cl.
*G09B 19/04* (2006.01)
*G09B 5/06* (2006.01)

(52) U.S. Cl.
CPC .............. *G09B 19/04* (2013.01); *G09B 5/06* (2013.01)

(58) Field of Classification Search
CPC ....................................................... G09B 19/04
USPC ........................................................ 434/185
See application file for complete search history.

(56) References Cited

U.S. PATENT DOCUMENTS

| 6,397,183 | B1 | 5/2002 | Baba et al. |
| 2009/0299733 | A1 | 12/2009 | Agapi et al. |
| 2013/0085955 | A1* | 4/2013 | Dugas ........................ 705/326 |

FOREIGN PATENT DOCUMENTS

| JP | 4-66998 H | 3/1992 |
| JP | 6-266382 A | 9/1994 |
| JP | H10-274999 A | 10/1998 |
| JP | H11-327870 A | 11/1999 |
| JP | 2004-246085 A | 9/2004 |
| WO | 2000021057 A1 | 4/2000 |

OTHER PUBLICATIONS

Japanese First Office Action dated Jun. 24, 2014 from corresponding Japanese Patent Application No. 2012-180447, 4 pages.

* cited by examiner

*Primary Examiner* — Kesha Frisby
(74) *Attorney, Agent, or Firm* — Ohlandt, Greeley, Ruggiero & Perle, L.L.P.

(57) ABSTRACT

According to one embodiment, a speech learning apparatus includes a detection unit, a first calculation unit, a generation unit, an addition unit and a speech synthesis unit. The first calculation unit calculates a score indicating a degree of emphasis of a keyword based on a type of the marker and a manner of selecting the keyword. The generation unit generates a synthesis parameter to determine a degree of reading of the keyword in accordance with the score and the type of the marker. The addition unit adds to the keyword a tag for reading the keyword in accordance with the synthesis parameter. The speech synthesis unit generates synthesized speech obtained by synthesizing speech of the keyword in accordance with the tag.

7 Claims, 11 Drawing Sheets

FIG. 1

| | 201 | 202 | 203 | 204 | 205 |
|---|---|---|---|---|---|
| | Content ID | Location | Keyword | Marker type | Score |
| 206 | 12345 | 0-17 | 19th-century Italy | Underline | 0.3 |
| | 12345 | 40-54 | Pope's territory | Yellow marker | 0.5 |
| | 12345 | 62-88 | Kingdom of the Two Sicilies | Yellow marker + underline | 0.8 |
| | 12345 | 95-113 | Kingdom of Sardinia | Yellow marker | 0.5 |
| | 12345 | 141-148 | Carbonari | Red marker | 1.0 |
| | ... | ... | ... | ... | ... |

801                    802
<emphasis level="strong">19th-century Italy</emphasis> was divided into <prosody pitch="+30%">the Pope's territory</prosody>, <prosody pitch="+30%">the Kingdom of the Two Sicilies</prosody>, <prosody pitch="+30%">the Kingdom of Sardinia </prosody>, etc. The secret society<prosody volume="+100" rate="-50%">,Carbonari, </prosody> and the Young Italy</prosody> of Mazzini<prosody volume="+100" rate= "-50%"> tried to unify the country but failed. In the 1850s, however, Prime Minister <prosody volume="+100" rate="-50%">Cavour</prosody> of the Kingdom of Sardinia pushed forward with the modernization of Italy. In <prosody pitch="+30%">1859 </prosody>, he <voice variant="alice">defeated Austria with the aid of France</voice> and unified most of northern Italy (<prosody volume="+100" rate="-50%">Italian Unification War</prosody>).

| Content ID | User ID | Location | Keyword | Marker type | Score |
|---|---|---|---|---|---|
| 12345 | 100 | 40-54 | Pope's territory | Yellow marker | 1.0 |
| 12345 | 100 | 62-88 | Kingdom of the Two Sicilies | Yellow marker | 0.8 |
| 12345 | 100 | 95-113 | Kingdom of Sardinia | Yellow marker | 0.8 |
| 12345 | 200 | 95-113 | Kingdom of Sardinia | Red marker | 1.0 |
| 12345 | 300 | 95-113 | Kingdom of Sardinia | Yellow marker | 0.8 |
| 12345 | 100 | 141-148 | Carbonari | Red marker | 1.0 |
| ... | ... | ... | ... | ... | ... |

World history (ID=12345)

[Name of Nation] of [Century] was divided into [Name of Nation], [Name of Nation], [Name of Nation], etc. The secret society, [Organization] and [Organization] of Mazzini tried to unify the country but failed. In the 1850s, however, Prime Minister [Person's name]—1401 of the Kingdom of Sardinia pushed forward with the modernization of Italy. In [Christian Era], he defeated [Name of Nation] with the aid of [Name of Nation] and unified most of northern [Name of Nation] ([War]).

1402 — Cavour

1403 — Eight correct answers/ten questions
Correct answer rate is 80%

FIG. 14

SPEECH LEARNING APPARATUS AND METHOD

CROSS-REFERENCE TO RELATED APPLICATIONS

This application is based upon and claims the benefit of priority from Japanese Patent Application No. 2012-180447, filed Aug. 16, 2012, the entire contents of which are incorporated herein by reference.

FIELD

Embodiments described herein relate generally to a speech learning apparatus and method.

BACKGROUND

As electronic books and electronic textbooks become popular, learners have been able to employ a new learning method in which they understand the content of the electronic books and textbooks not only by eyes but also by ears using a speech synthesis technology. There is a great advantage to understanding the content of electronic books and electronic textbooks by ears. For example, a learning method for memorizing text while listing to the text repeatedly is called speech learning and it is known that the learning method improves learning efficiency. In this method, however, reading of synthesized speech is monotonous and thus it is hard to understand what is important. To prevent this, there is a technique of generating well-modulated synthesized speech using markup language called speech synthesis markup language (SSML).

DETAILED DESCRIPTION

In the technique described in the above, there is no interface for designating an important keyword through interaction with a user. For all users that listen to the same content, the same keyword will be emphasized. Thus, the users are unable to easily customize the speech corresponding to the content in accordance with their own learning states.

Furthermore, the above technique does not dynamically keep up with a change in importance of keywords with user's learning progress. The keywords that a user has already memorized are still emphasized and read. It is thus difficult for the user to understand what is important for learning.

In general, according to one embodiment, a speech learning apparatus includes a detection unit, a first calculation unit, a generation unit, an addition unit and a speech synthesis unit. The detection unit is configured to detect a keyword corresponding to a character string selected from text by a user using a marker. The first calculation unit is configured to calculate a score indicating a degree of emphasis of the keyword based on a type of the marker and a manner of selecting the keyword. The generation unit is configured to generate a synthesis parameter to determine a degree of reading of the keyword in accordance with the score and the type of the marker. The addition unit is configured to add to the keyword a tag for reading the keyword in accordance with the synthesis parameter. The speech synthesis unit is configured to generate synthesized speech obtained by synthesizing speech of the keyword in accordance with the tag.

Referring to the accompanying drawings, a speech learning apparatus, method and program according to the following embodiments will be described below. In the embodiments, the respective units denoted by the same reference numeral perform the same operation and thus their overlapping descriptions will be omitted as appropriate.

First Embodiment

A speech learning apparatus according to a first embodiment will be described with reference to the block diagram shown in FIG. 1.

Figure 1:
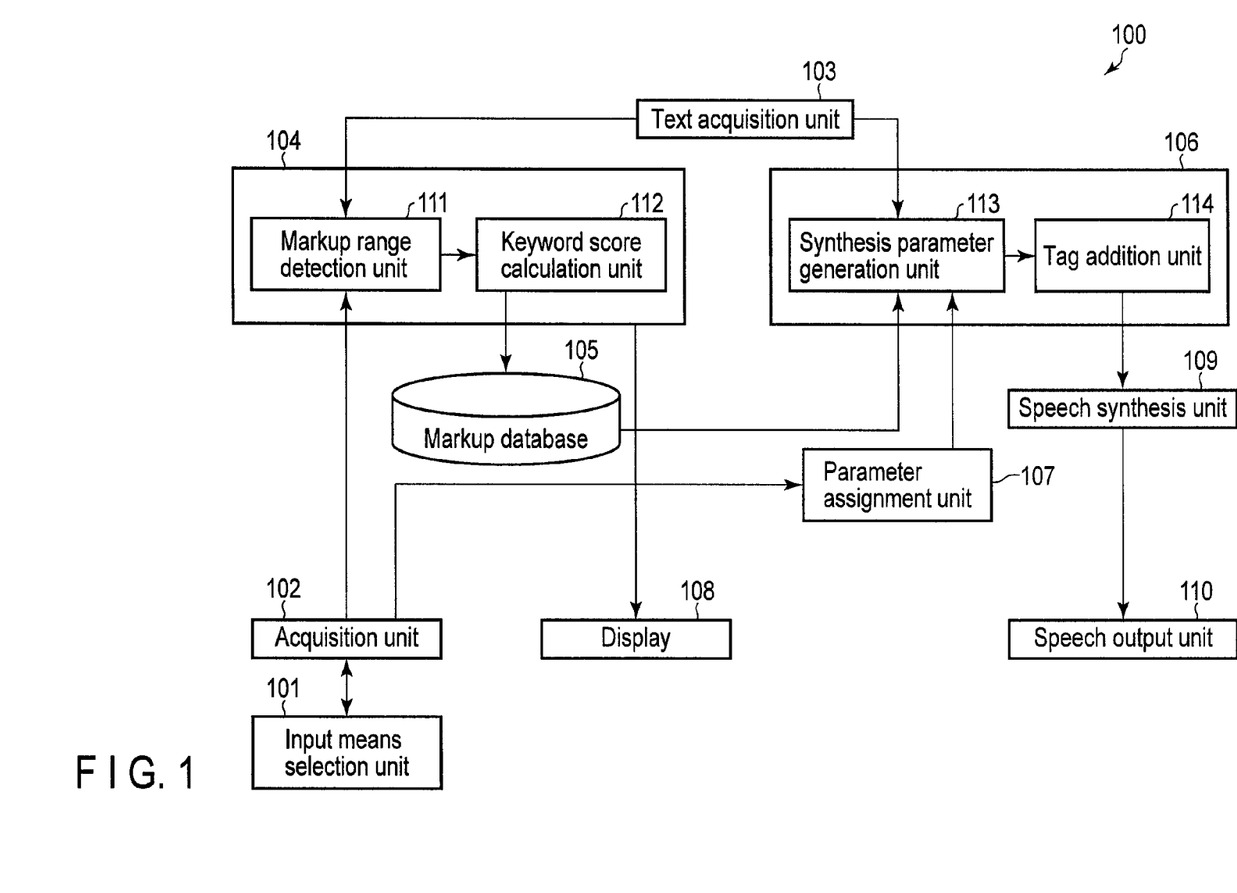
FIG. 1 is a block diagram illustrating a speech learning apparatus according to a first embodiment.

FIG. 1 shows a speech learning apparatus 100 according to the first embodiment. The apparatus 100 includes an input means selection unit 101, an acquisition unit 102, a text acquisition unit 103, a markup management unit 104, a markup database 105, a tagged text generation unit 106, a parameter assignment unit 107, a display 108, a speech synthesis unit 109 and a speech output unit 110. The markup management unit 104 includes a markup range detection unit 111 and a keyword score calculation unit 112. The tagged text generation unit 106 includes a synthesis parameter generation unit 113 and a tag addition unit 114.

The input means selection unit 101 selects a type of marker designated by a user. The marker is a means for designating the range of a character string and the way to read the character string through the speech synthesis.

The acquisition unit 102 receives the type of marker selected by the input means selection unit 101. The acquisition unit 102 acquires coordinate information on the screen selected by the user.

The text acquisition unit 103 acquires the text of content such as an electronic book and an electronic textbook.

The markup management unit 104 receives the type of marker and the coordinate information from the acquisition unit 102 and also receives the text of content from the text acquisition unit 103. The markup management unit 104 calculates a score of a keyword that is a character string designated by the user using the marker. The unit 104 also generates a text marked up by the marker (referred to as a markup text hereinafter).

The markup database 105 receives the score from the markup management unit 104 and stores it as markup information. The markup information will be described later with reference to FIG. 2.

The tagged text generation unit 106 receives the text of content from the text acquisition unit 103. Referring to the markup information stored in the markup database 105, the unit 106 generates a synthesis parameter and adds a tag corresponding to the synthesis parameter to the text. The synthesis parameter is a parameter for determining a degree of reading of the text and its descriptions will be given later with reference to FIG. 5. In the first embodiment, the tag is assumed as an SSML tag; however, any tag can be used if it can control reading of text.

The parameter assignment unit 107 changes assignment of the tag and synthesis parameter to the marker according to user's designation.

The display 108 receives the markup text from the markup management unit 104 and displays it.

The speech synthesis unit 109 receives a tagged text from the tagged text generation unit 106 to synthesize the speech of the tagged text into synthesized speech. Speech synthesis processing is commonly known and thus its explanation is omitted.

The speech output unit 110 receives the synthesized speech from the speech synthesis unit 109 and outputs it.

The markup management unit 104 will be described in detail.

The markup range detection unit 111 receives the type of marker and the coordinate information from the acquisition unit 102 and also receives the text of content from the text acquisition unit 103 to detect a character string from the designation range of the marker on the basis of the coordinate information, thereby obtaining a keyword. The unit 111 also detects a method of designating a keyword by the user using the marker and detects a markup text.

The keyword score calculation unit 112 receives the type of marker and the method of designating a keyword using the marker from the markup range detection unit 111 and calculates a score of the keyword.

The tagged text generation unit 106 will be described in detail below.

The synthesis parameter generation unit 113 receives text and markup information from the text acquisition unit 103 and the markup database 105, respectively to generate a synthesis parameter for each keyword.

The tag addition unit 114 receives the text and the synthesis parameter of each keyword from the synthesis parameter generation unit 113 to add an SSML tag to the keyword so as to read a character string in accordance with the synthesis parameter.

An example of the markup information stored in the markup database 105 will be described with reference to FIG. 2.

Figure 2:
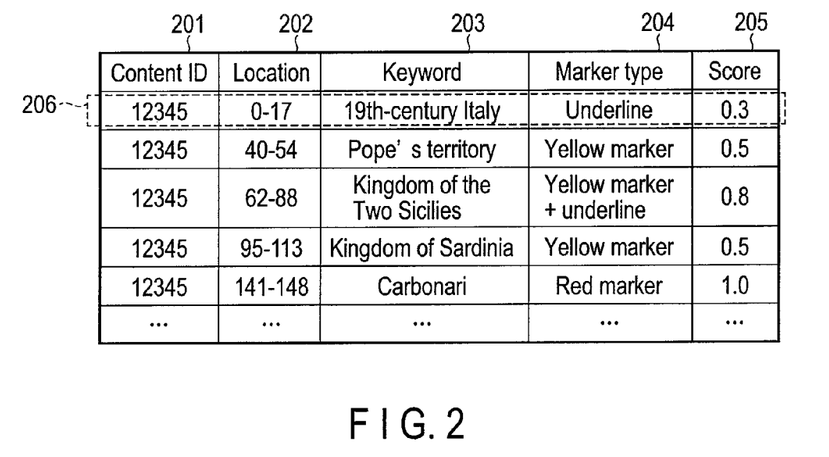
FIG. 2 is a table illustrating an example of markup information stored in a markup database.

Referring to FIG. 2, content ID 201, location 202, keyword 203, marker type 204 and score 205 correspond to one another and are stored as markup information 206.

The content ID 201 is an identifier uniquely assigned to each type of the content. The location 202 indicates a location in which a keyword appears and, in the example of FIG. 2, it indicates the number of characters of content from the beginning. The keyword 203 indicates a marked-up character string. The marker type 204 indicates the type of a marker used for markup. The score 205 indicates a degree of emphasis of a keyword, which corresponds to the marker type.

As a specific example of the markup information 206 to be stored, "12345" of content ID 201, "0-17" of location 202, "19th century Italy" of keyword 203, "underline" of marker type 204 and "0.3" of score 205 correspond to one another.

The operation of the markup management unit 104 will be described below with reference to the flowchart of FIG. 3.

In step S301, the markup range detection unit 111 acquires text and coordinate information on a screen selected by a user.

In step S302, the markup range detection unit 111 detects which character string is selected from the coordinate information and acquires a selected keyword of the selected character string. The method of detecting a keyword selected from the coordinate information is commonly known and thus its explanation is omitted.

In step S303, the markup range detection unit 111 converts the range of the selected keyword into a numerical value. If the selected keyword corresponds to the 10th to 15th characters from the beginning of the text, the range is converted into a numerical value of (10, 15). From this numerical value, the location 202 shown in FIG. 2 is obtained. The range of a selected keyword can be represented by any method if even the location of the selected keyword can be specified.

In step S304, the keyword score calculation unit 112 calculates a score from the type of marker and a user's method of selecting a keyword using the marker. The score is indicated by a fractional value of "0.0" to "1.0", for example. The larger the fractional value, the more important the selected keyword. A portion that is not marked with a marker, or a character string in text, which is not a selected keyword, is considered to be less important and its score is set to "0.0".

In the keyword selecting method using a marker, for example, a score can be increased by marking the same keyword with a marker two times. More specifically, with reference to FIG. 2, when a user selects a keyword "Kingdom of the Two Sicilies" with a yellow marker and an underline, the score "0.5" of the yellow marker and the score "0.3" of the underline can be added together to obtain score "0.8". The score can be indicated by any numerical value if it can represent the importance of a keyword.

In step S305, the keyword score calculation unit 112 stores the selected keyword, the range of the selected keyword, the type of marker and the score in the markup database 105. After that, the operation of the markup management unit 104 is completed.

Figure 4:
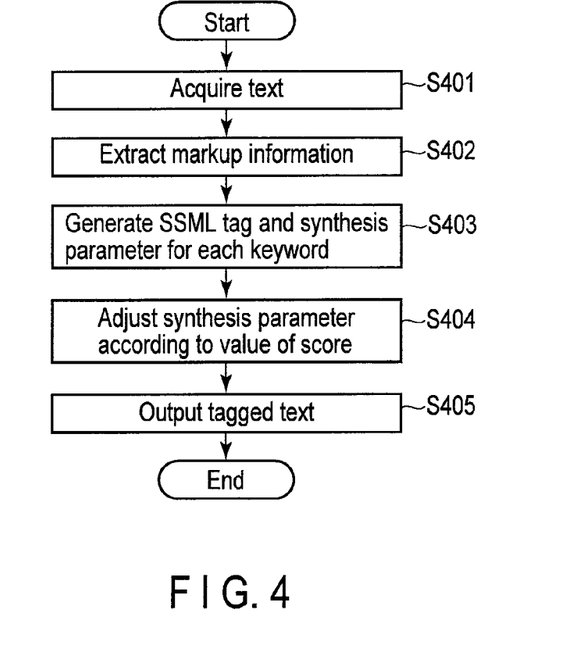
FIG. 4 is a flowchart illustrating an operation of a tagged text generation unit.

The operation of the tagged text generation unit 106 will be described below with reference to the flowchart of FIG. 4.

In step S401, the synthesis parameter generation unit 113 acquires text.

In step S402, the synthesis parameter generation unit 113 extracts markup information from the markup database 105.

In step S403, the synthesis parameter generation unit 113 generates an SSML tag and a synthesis parameter for each keyword. The generated synthesis parameter is, e.g., a parameter for adjusting the pitch, volume, rate and voice of synthesized speech.

In step S404, the synthesis parameter generation unit 113 adjusts the synthesis parameter in accordance with the scores. For example, linear interpolation has only to be performed between scores "1.0" and "0.0", as will be described later.

In step S405, the tag addition unit 114 adds an SSML tag corresponding to the synthesis parameter to a keyword to generate text with the SSML tag. After that, the operation of the tagged text generation unit 106 is completed.

An example of a method for generating a synthesis parameter by the synthesis parameter generation unit 113 will be described below with reference to FIG. 5.

Figure 5:
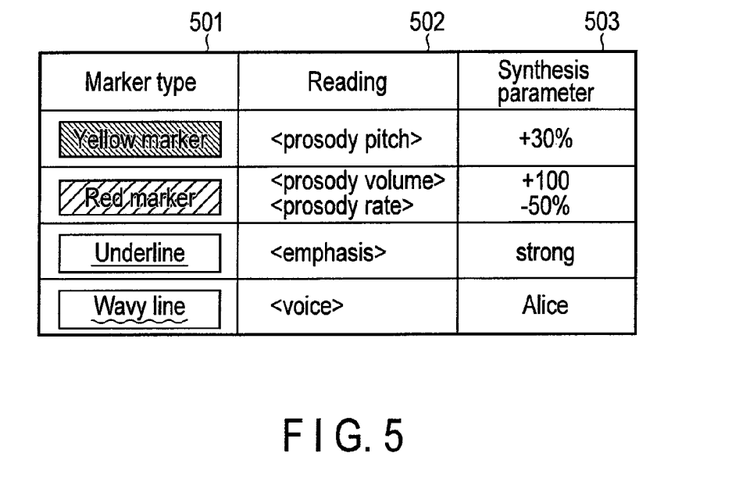
FIG. 5 is a table illustrating an example of a synthesis parameter generation method in a synthesis parameter generation unit.

The synthesis parameter generation unit 113 may have a table as shown in FIG. 5. FIG. 5 shows the value of a synthesis parameter when the score 205 shown in FIG. 2 is "1.0."

In the table of FIG. 5, a marker type 501, reading 502 and a synthesis parameter 503 correspond to one another. For example, the marker type 501 is "yellow marker," the reading 502 is "<prosody pitch>" and the synthesis parameter 503 is "30%" and these correspond to one another. In the example of FIG. 5, therefore, when a keyword is marked with a yellow marker, the pitch of synthesized speech is increased 30% and when a keyword is marked with a red marker, the "<volume>" of synthesized speech is set at "+100" and the "<rate>" thereof becomes "−50%." If a keyword is underlined, the "<emphasis>" of synthesized speech is set at "strong." If a keyword is marked with a wavy line, the "<voice>" of synthesized speech is set to "Alice."

It depends on user's indication what SSML tag and what synthesis parameter can be assigned to each of the markers by the parameter assignment unit 107. A portion in text to which no SSML tag is added is spoken in default speech.

An example of a method for adjusting the score of a keyword by the synthesis parameter generation unit 113 will be described below with reference to FIG. 6.

Figure 6:
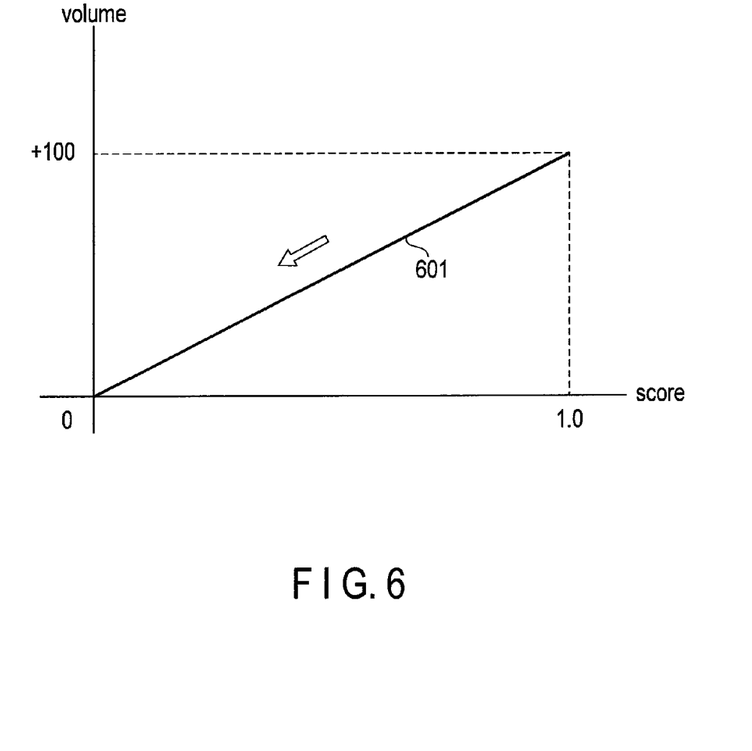
FIG. 6 is a graph illustrating an example of a score adjustment method in the synthesis parameter generation unit.

FIG. 6 shows a graph 601 of linear interpolation of the synthesis parameter, in which the vertical axis indicates the volume of synthesized speech and the horizontal axis indicates the score of a keyword. As shown in FIG. 6, when the score is "1.0," the values set by the synthesis parameter shown in FIG. 5 are used. The synthesis parameter is adjusted in such a manner that the volume of synthesized speech linearly decreases as the score becomes close to "0.0" and default speech is made when the score is "0.0." Adjusting the synthesis parameter in accordance with the score, when a selected keyword is more important and its score is higher, a difference between the default speech and the synthesized speech becomes wider, which attracts user attention. When a selected keyword is less important and its score is lower to the contrary, a difference between the default speech and the synthesized speech becomes smaller, which does not attract user attention.

A qualitative SSML tag such as emphasis and voice cannot change a parameter even by linear interpolation as shown in FIG. 6. Using a known technique called speech morphing, the synthesized speech can be made close to the default speech gradually in accordance with the score of a keyword.

Not only the linear interpolation but also any interpolation method can be employed if the synthesized speech can be made close to the default speech as the score of a keyword becomes lower. The score of a keyword can be set high at the beginning of learning and then it can be set low as user's memorization advances.

An example of use of a speech learning apparatus according to the first embodiment will be described with reference to FIG. 7.

Figure 7:
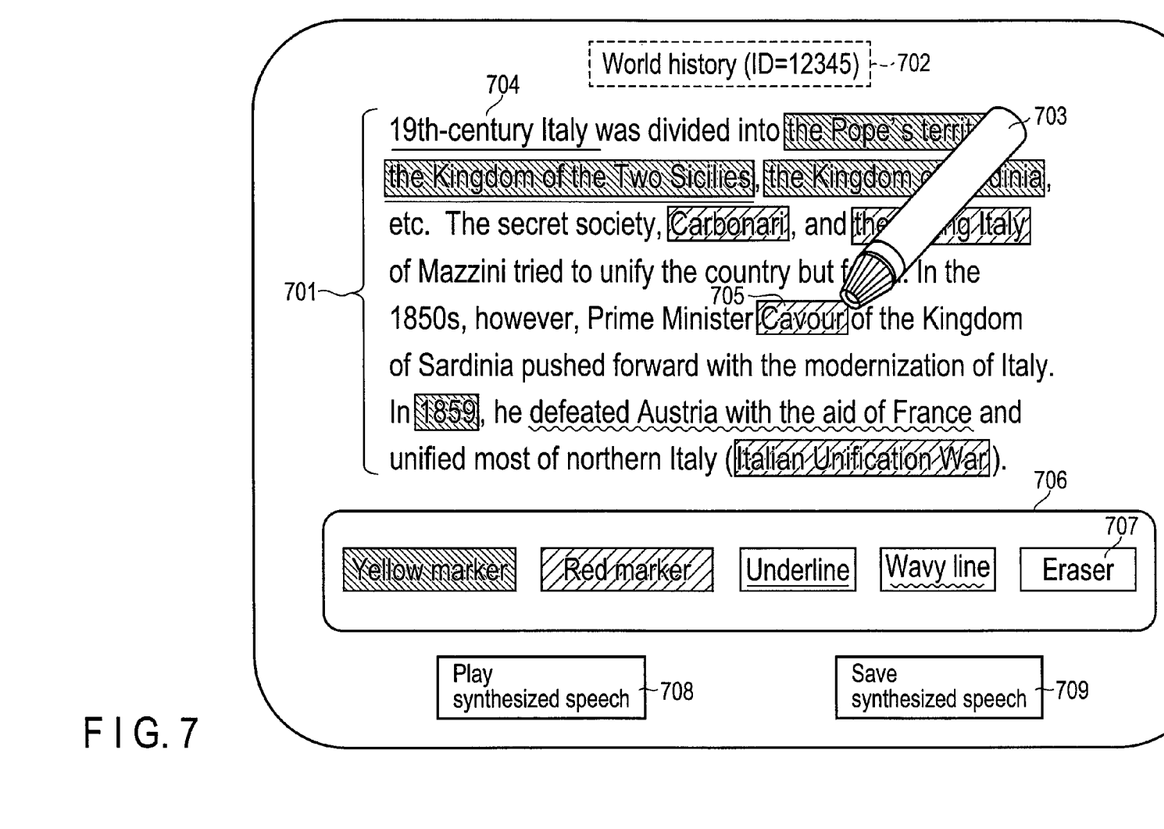
FIG. 7 illustrates an example of use of a speech learning apparatus according to a first embodiment.

FIG. 7 shows an example of text displayed on the display 108 in which a user looks at the text of the world history on the assumption that he or she browses an electronic book or an electronic textbook. The title of content and content ID 702 are added to text 701.

The user is able to draw an underline 704 and a color marker 705 on the displayed text 701 with a finger or a stylus 703, as in the case where a user draws an underline and a marker on a paper book. The display 108 includes a pallet 706 in which usable markers are displayed and the pallet 706 includes markers such as an underline 704 and color markers 705 and an erase marker (eraser) 707 for erasing the markers. The user is able to select one of the markers by touching its corresponding button in the pallet 706 with his or her finger or the stylus 703.

If the user draws an underline on the portion of "19th century Italy" as a keyword to be memorized, the voice of the underlined portion can be changed to synthesized speech. If the user draws a red marker on the portion of "Cavour," its synthesized speech can be emphasized.

To emphasize a keyword, it can be circled, surrounded with a rectangle, and written in bold and italics, and its font can be changed. In other words, a keyword in text may be emphasized by any means if the means can specify the range of the keyword in the text and produce a visual effect in the text.

The user is able to play the synthesized speech by touching a synthesized speech play button 708. The user is also able to save the synthesized speech as a file and listen to it through another device. For example, the user is able to save the synthesized speech by touching a synthesized speech save button 709 and listen to it through an audio player.

An example of tagged text generated by the tag addition unit 114 will be described with reference to FIG. 8.

Figure 8:
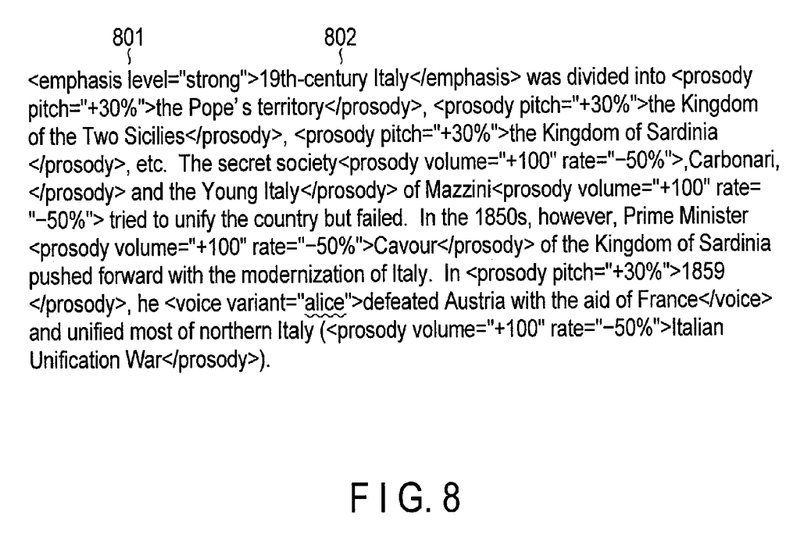
FIG. 8 illustrates an example of a tagged text generated by a tag addition unit.

As shown in FIG. 8, an SSML tag 801 is added to a keyword 802. For example, in order to emphasize a keyword "19th century Italy," it is interposed between SSML tags "<emphasis level="strong">" and "</emphasis>." Likewise, a keyword "Pope's territory" is interposed between SSML tags "<prosody pitch="+30%">" and "</prosody>" to adjust the pitch of the keyword. In accordance with these SSML tags, the speech synthesis unit 109 performs speech synthesis to generate synthesized speech and output it from the speech output unit 110.

The thickness of a marker and a line can be varied with the score of a keyword. If the display of a marker as well as the synthesized speech is varied with the score of a keyword, a user can more easily understand what the user should pay attention to in his or her learning.

According to the first embodiment described above, a keyword designated by a user can be emphasized visually and audibly by generating a synthesis parameter in accordance with the type of marker. In other words, if a user has only to mark an important keyword by interacting with a apparatus, the emphasis of synthesized speech of the keyword can be varied. As a result, the synthesized speech of the keyword differs from other words and thus the user who listens to the synthesized speech is able to pay attention to the keyword and support efficient learning.

Second Embodiment

In the first embodiment, the synthesis parameter is varied with the score of a keyword which depends upon the type of marker designated by a user and the method for designating the keyword with the marker. In the second embodiment, a score of a keyword designated by a user is determined on the basis of markup information shared with another user. Accordingly, the user is able to support his or her efficient learning in accordance with his or her leaning stage.

A speech learning apparatus according to the second embodiment will be described with reference to FIG. 9.

Figure 9:
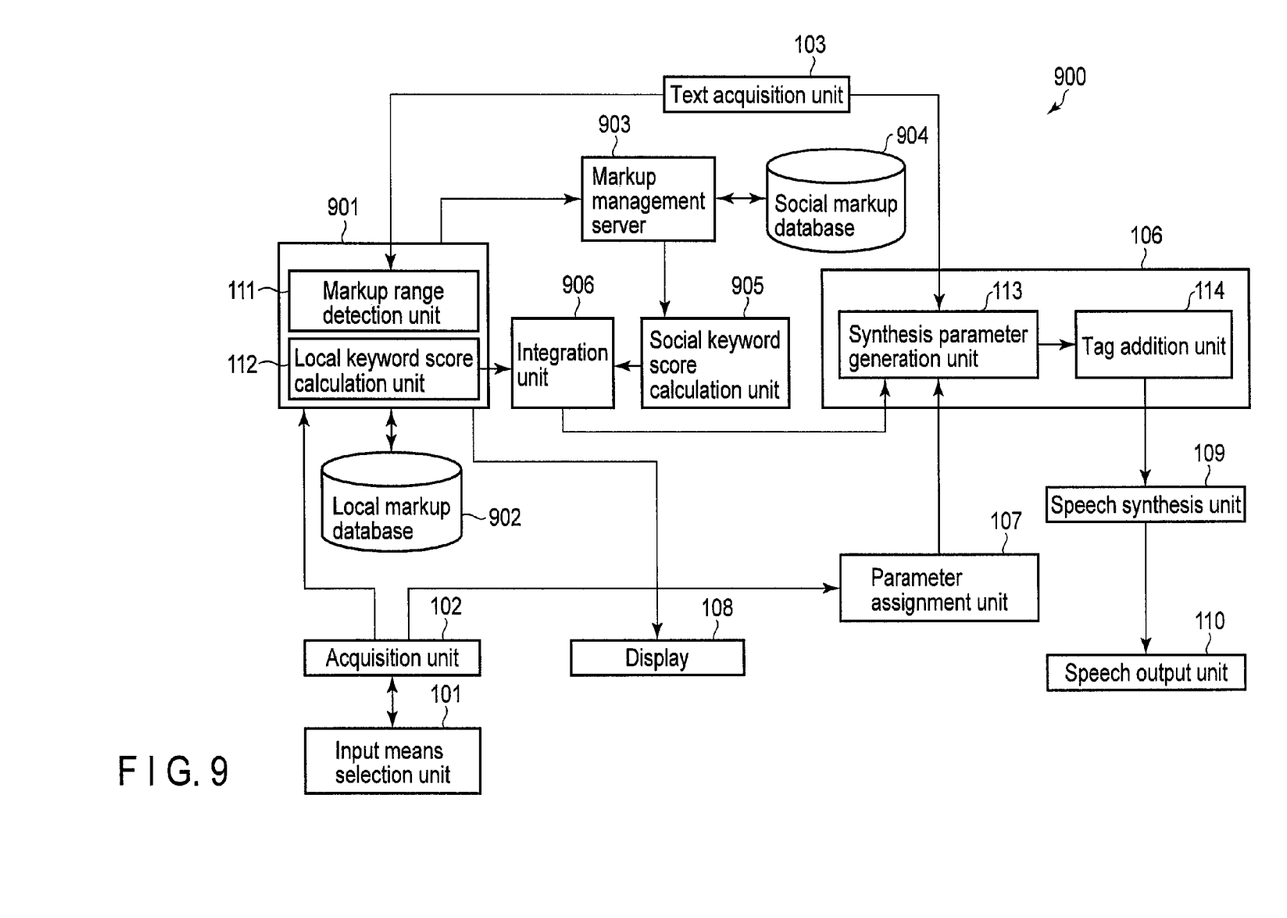
FIG. 9 is a block diagram illustrating a speech learning apparatus according to a second embodiment.

FIG. 9 shows a speech learning apparatus 900 according to the second embodiment. The apparatus 900 includes an input means selection unit 101, an acquisition unit 102, a text acquisition unit 103, a tagged text generation unit 106, a parameter assignment unit 107, a display 108, a speech synthesis unit 109, a speech output unit 110, a local markup management unit 901, a local markup database 902, a social keyword score calculation unit 905, a markup management server 903, a social markup database 904 and an integration unit 906.

The descriptions of the input means selection unit 101, acquisition unit 102, text acquisition unit 103, tagged text generation unit 106, parameter assignment unit 107, display 108, speech synthesis unit 109 and speech output unit 110 are omitted here because these units perform the same operations as those in the first embodiment.

The local markup management unit 901 performs almost the same operation as that of the markup management unit 104 of the first embodiment and differs in that it transmits markup information stored in the local markup database 902 (referred to as local markup information hereinafter) to the markup management server 903.

The description of the local markup database 902 is omitted here because it performs the same operation as those of the markup management unit 104 and the markup database 105 of the first embodiment.

The markup management server 903 receives markup information from the local markup management unit 901 and sends it to the social markup database 904. The markup management server 903 also extracts markup information of another user from the social markup database 904.

The social markup database 904 receives markup information from the markup management server 903 and stores it. The social markup database 904 also stores social markup information that is markup information of another user.

The social keyword score calculation unit 905 receives markup information of another user from the markup management server 903 and calculates a score of each keyword from the markup information of another user. Hereinafter, the score obtained from the markup information of another user is called a social score.

The integration unit 906 receives a score based on the local markup information (which is also called a local score) from the local markup management unit 901 and also receives a social score from the social keyword score calculation unit 905. Then, the integration unit 906 calculates an integration score that is a weighted value of the local score and the social score.

Figure 10:
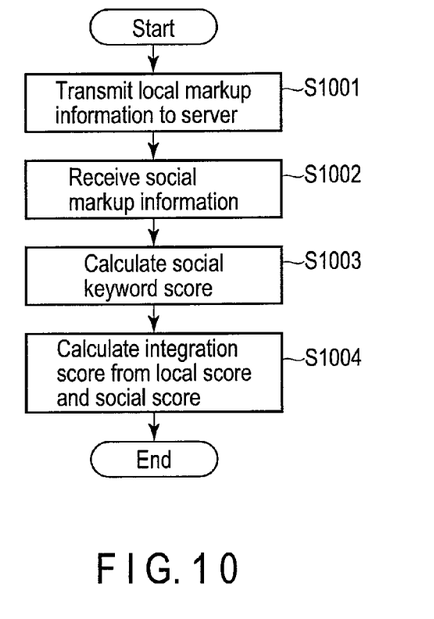
FIG. 10 is a flowchart illustrating an operation of the speech learning apparatus according to the second embodiment.

An operation of the speech learning apparatus 900 according to the second embodiment will be described with reference to the flowchart shown in FIG. 10.

In step S1001, the local markup management unit 901 transmits markup information to the markup management server 903.

In step S1002, the social keyword score calculation unit 905 receives markup information of another user, which is stored in the social markup database 904, from the markup management server 903.

In step S1003, the social keyword score calculation unit 905 calculates a social score of each keyword from the social markup information. The social score of a keyword has only to be obtained by a statistical value such as an average of scores when the keyword is marked up by a plurality of users.

In step S1004, the integration unit 906 calculates an integration score of each keyword from the local score and the social score. If the weight of the local score is 0.0 and that of the social score is 1.0, only the social score is reflected in synthesis speech and text displayed on the display unit. If the weight of the local score is 0.5 and that of the social score is 0.5, an average score is obtained. After that, the operation of the speech learning apparatus according to the second embodiment is completed.

The social markup information stored in the social markup database 904 will be described with reference to FIG. 11.

Figure 3:
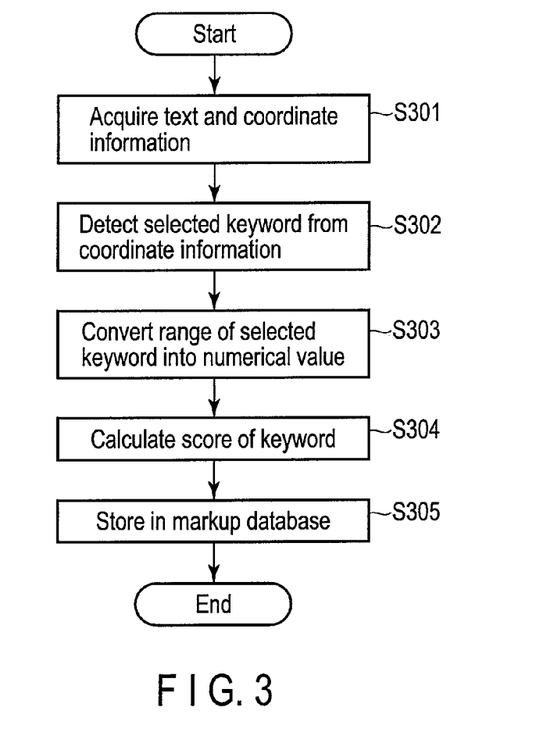
FIG. 3 is a flowchart illustrating an operation of a markup management unit.
Figure 11:
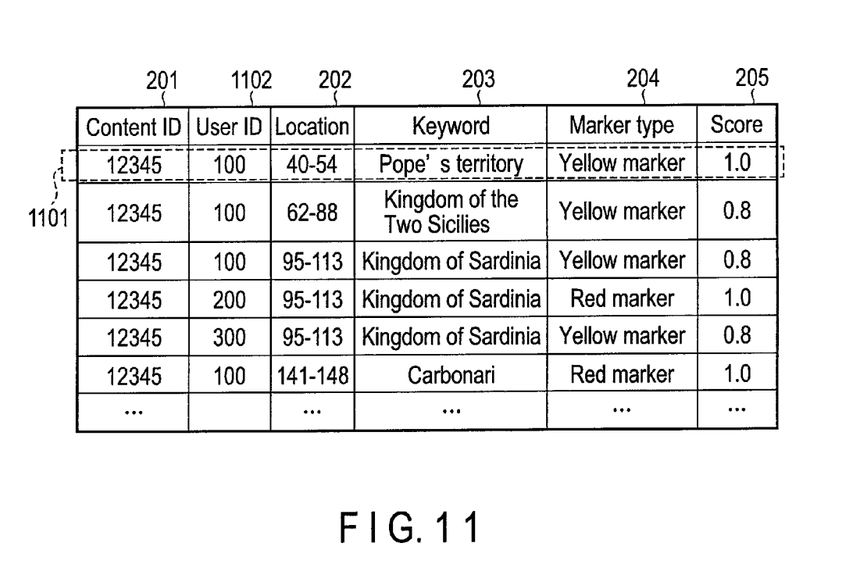
FIG. 11 is a table illustrating an example of social markup information stored in a social markup database.

The social markup information 1101 shown in FIG. 11 is almost the same as the markup information shown in FIG. 3 and differs in that a user ID 1102 for identifying a user is added thereto. For example, three users with IDs of "100," "200" and "300" add a marker to the keyword "Kingdom of Sardinia." Referring to the user ID 1102, the social keyword score calculation unit 905 identifies a user and calculates a social score. For example, if the "Kingdom of Sardinia" is a keyword, the social score can be obtained as "(0.8+1.0+0.8)/3=0.86" from the social markup information of the three users.

With the markup management server 903, level information indicative of the progress of each user's learning may be stored in the social markup database 904 in association with the social markup information. When a plurality of users execute learning programs using the same text, keywords in the text should vary in their importance between beginning and advanced learners. For example, advanced learners need to memorize more particular keywords than beginning learners, and a keyword that is important to beginning learners may not be so important to advanced learners because they have already memorized it.

If, therefore, level information of each user is stored in the social markup database 904, it is possible to extract only the markup information of users of the same level and calculate a statistical value of scores.

According to the second embodiment described above, if a user who is a beginning learner refers to the markup information of another user, the beginning learner is able to know a keyword that a number of users recognize as important even though he or she does not know whether the keyword is important, with the result that efficient learning can be supported.

Third Embodiment

The third embodiment differs from the above embodiments in that the score of a keyword varies with the status of learning.

Figure 12:
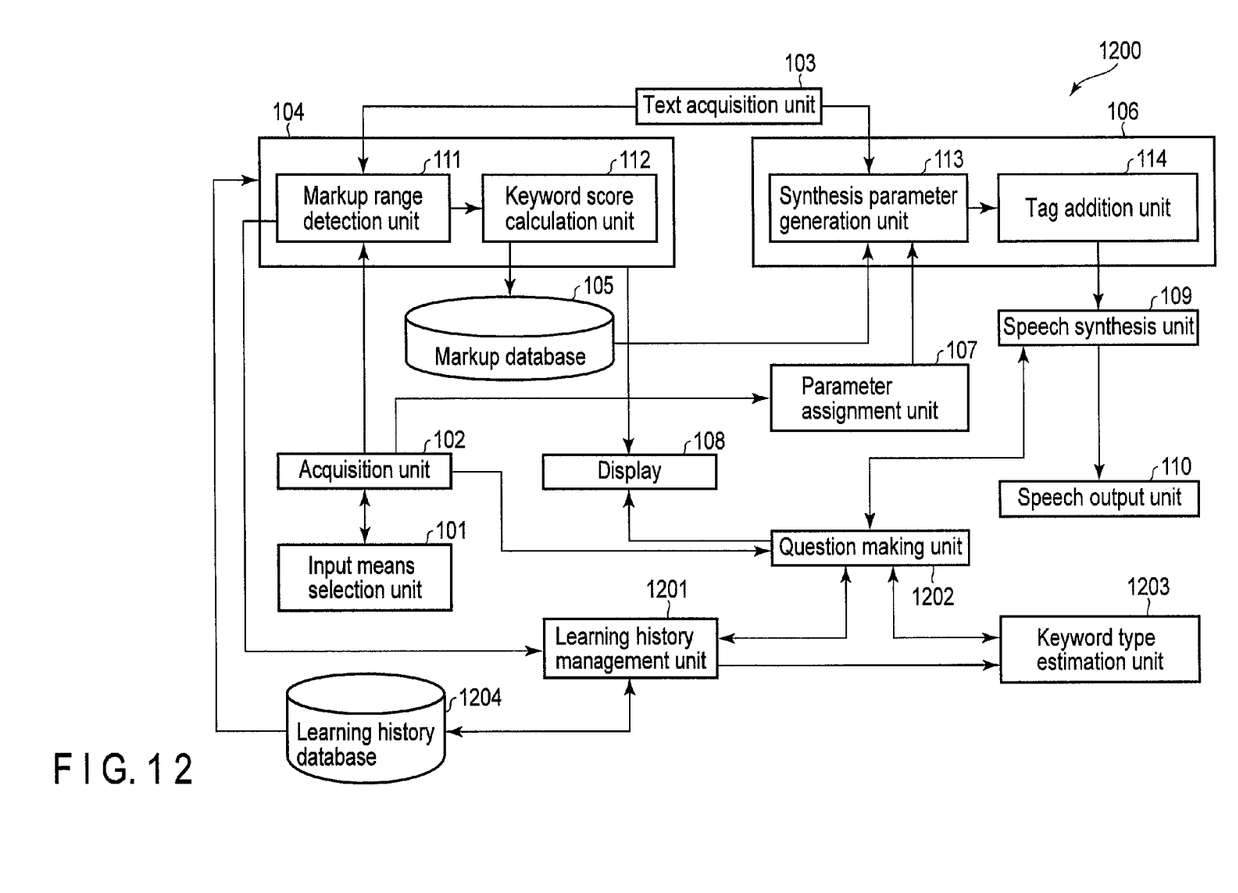
FIG. 12 is a block diagram illustrating a speech learning apparatus according to a third embodiment.

The speech learning apparatus 1200 according to the third embodiment will be described with reference to the block diagram shown in FIG. 12.

The apparatus 1200 includes an input means selection unit 101, an acquisition unit 102, a text acquisition unit 103, a markup management unit 104, a markup database 105, a tagged text generation unit 106, a parameter assignment unit 107, a display 108, a speech synthesis unit 109, a speech output unit 110, a learning history management unit 1201, a question making unit 1202, a keyword type estimation unit 1203 and a learning history database 1204.

The learning history management unit 1201 receives a marked-up keyword from the markup management unit 104. The unit 1201 also receives user's answers from the question making unit 1202, which will be described later and calculates a correct answer rate based on the user's answers to make a learning history. The learning history includes information of a question-making date, the number of questions, the number of correct answers, a correct answer rate and the like.

The question making unit 1202 receives a type of keyword from the keyword type estimation unit 1203 and converts a character string of a keyword in text into that of the type of keyword. The type of keyword indicates an attribute of the keyword. As the type of keyword, there are the names of nations, persons and eras, for example. After that, the question making unit 1202 makes a question about a character string of the type of keyword to a user and receives a user's answer to the question.

The keyword type estimation unit 1203 receives a keyword from the learning history management unit 1201 to estimate a type of the keyword. The type of keyword has only to be estimated using a commonly known technique that is called named entity extraction.

The learning history database 1204 receives a learning history of questions about a keyword from the learning history management unit 1201 and stores it.

Figure 13:
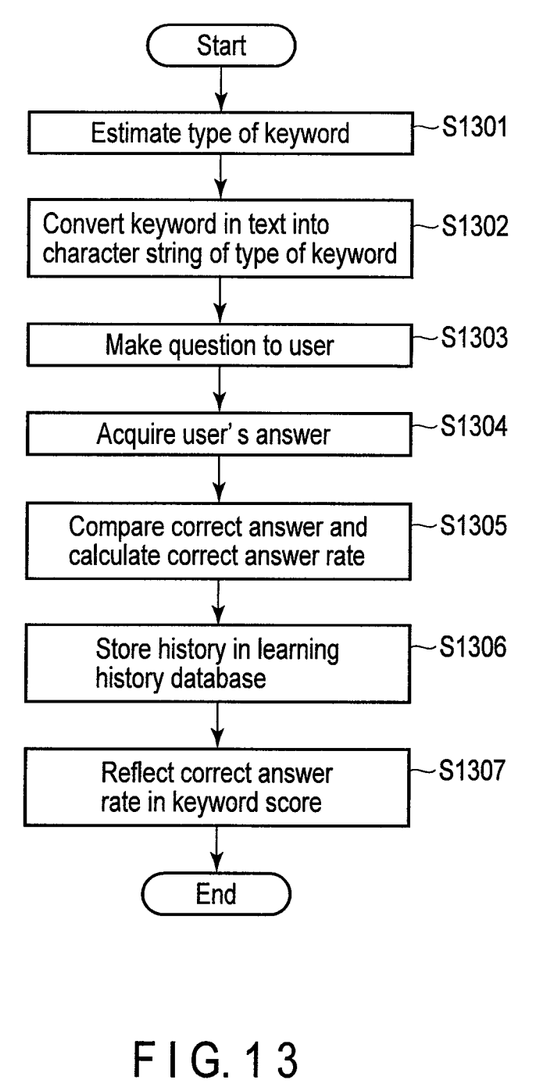
FIG. 13 is a flowchart illustrating an operation of the speech learning apparatus according to the third embodiment.

An operation of the speech learning apparatus 1200 according to the third embodiment will be described with reference to the flowchart of FIG. 13.

In step S1301, the keyword type estimation unit 1203 estimates a type of keyword.

In step S1302, the question making unit 1202 converts a character string of a keyword in text into that of the type of keyword. If the keyword is "Italy," the type of keyword is "name of nation" and thus the character string of the keyword in text is converted from "Italy" to "name of nation."

In step S1303, the question making unit 1202 makes a question about a character string of the type of keyword to a user.

In step S1304, the acquisition unit 102 acquires an answer from the user. For example, the unit 102 has only to acquire it through a stylus or a keyboard. When the display 108 displays no text and the user uses his or her speech only, the speech can be recognized by a speech recognition unit (not shown).

In step S1305, the question making unit 1202 compares the keyword as a question and the user's answer and determines whether or not the answer is correct, thereby obtaining a result of the answer. After that, the learning history management unit 1201 calculates a correct answer rate based on the result of the answer.

In step S1306, the learning history management unit 1201 makes a learning history including the correct answer rate and stores it in the learning history database 1204.

In step S1307, the keyword score calculation unit 112 refers to the learning history database 1204 and reflects the correct answer rate in the score of the keyword. For example, it is considered that a keyword with a high correct answer rate has already been memorized by a user and thus the importance of the keyword is lower than that of a keyword that has not been memorized yet. Conversely, it is considered that a keyword with a low correct answer rate has not yet been memorized by a user and thus its importance is high. Accordingly, the keyword score calculation unit 112 calculates a score of the keyword from the correct answer rate in such a manner that the score becomes lower as the correct answer rate increases and the score becomes higher as the correct answer rate decreases. As a simple method, a score can be calculated by subtracting the correct answer rate from 1.0. Any other method can be employed if the correct answer rate and the score are inversely proportional to each other. After that, the operation of the speech learning apparatus according to the third embodiment is completed.

If the keyword score calculation unit 112 calculates a keyword score and the tagged text generation unit 106 generates a synthesis parameter, it is possible to output synthesized speech of the emphasized keyword in accordance with user's learning state.

An example of use of the speech learning apparatus 1200 according to the third embodiment will be described with reference to FIG. 14.

Figure 14:
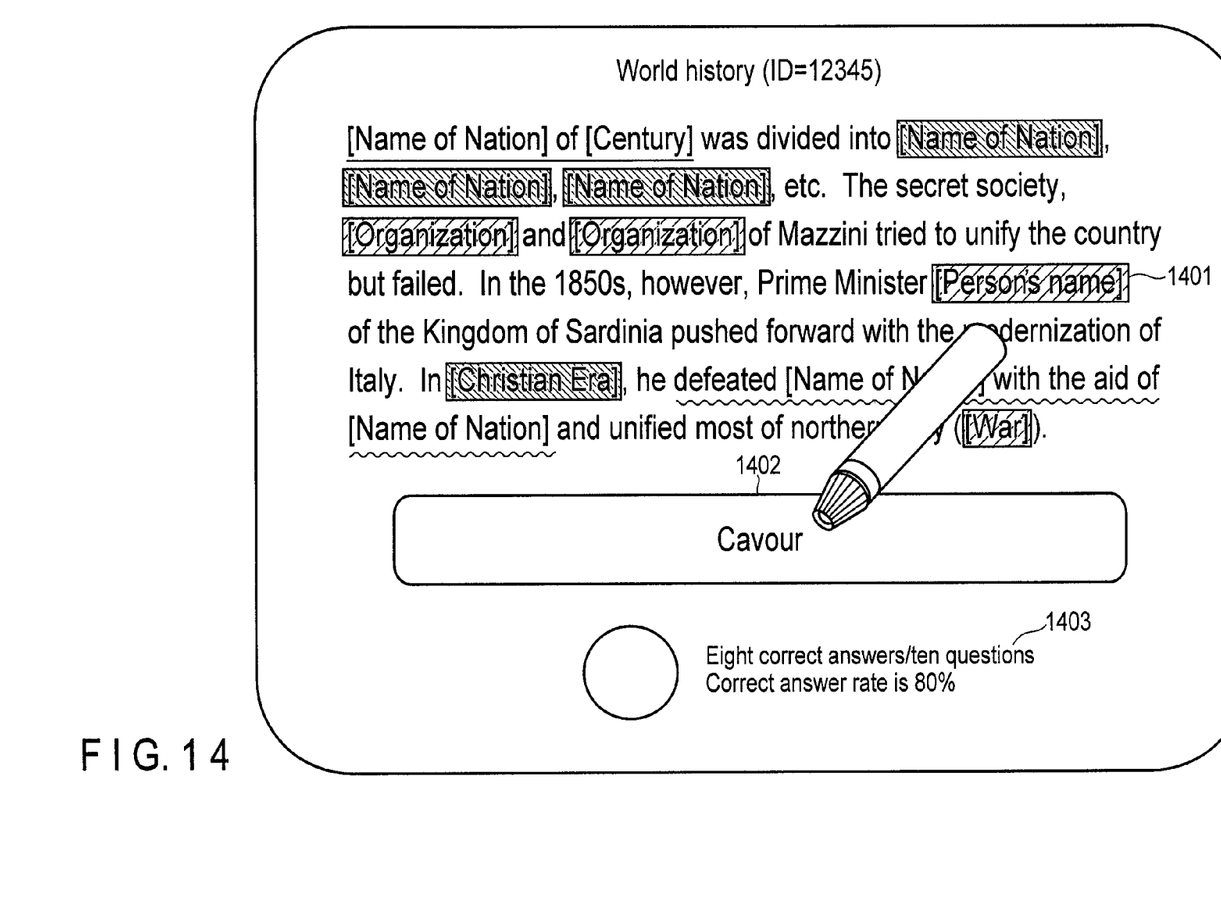
FIG. 14 illustrates an example of use of the speech learning apparatus according to the third embodiment.

FIG. 14 shows an example of a question displayed on the display 108 by the question making unit 1202. Assume here that "person's name" of the keyword 1401 is displayed as a question and a user answers "Cavour" in an answer column 1402. A learning history display area 1403 displays a learning history, such as "eight correct answers/ten questions" and "correct answer rate of 80%."

As an example of use, the following operation can be considered. The score of a keyword is set high at the beginning of user's learning, and the keyword is easily memorized by emphasizing its synthesized speech. As the memorization increases, the synthesized speech is returned to a default speech by lowering the score gradually from a memorized keyword with a high correct answer rate. Accordingly, the synthesized speech of a keyword is well-modulated and a user can clearly know what should be noted to memorize the keyword.

When a question is made by speech, the character string of the type of a keyword into which the keyword is converted has only to be read. If a keyword is converted into "person's name" as a type, the speech synthesis unit 109 has only to synthesize the speech of the "person's name."

According to the third embodiment described above, a question about a keyword is given to a user and the correct answer rate of the question is reflected in the score of the keyword, with the result that a user increases in motivation for learning in the form of a quiz and efficient learning can be supported.

In the above embodiments, a high-score keyword is emphasized using an SSML tag; however, it can be emphasized without using an SSML tag. For example, a keyword can be emphasized by any other means of speaking a high-score keyword repeatedly, pausing before and after a keyword, producing sound effects and making an auxiliary speech such as "this is important." The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech learning apparatus comprising:
a processor, programmed to
detect a keyword corresponding to a character string selected from a text;
calculate a score indicating a degree of emphasis of the keyword based on a manner of selecting the keyword;
generate a synthesis parameter to determine a degree of reading of the keyword in accordance with the score;
add to the keyword a tag for reading the keyword in accordance with the synthesis parameter;
generate synthesized speech obtained by synthesizing speech of the keyword in accordance with the tag;
calculate a social score indicating a score of the keyword selected by one or more other users different from the user; and
calculate an integration score using the score and the social score,
wherein the synthesis parameter is generated in accordance with the integration score.

2. The apparatus according to claim 1, wherein the synthesis parameter is generated such that as the score decreases, the reading becomes closer to that in a case where the tag is not added.

3. The apparatus according to claim 1, further comprising a marker that is used for the manner of selecting the keyword, the reading varies with a type of the marker.

4. The apparatus according to claim 1, wherein the processor is further programmed to
give a question relating to a keyword to the user; and
calculate a correct answer rate based on an answer to the question from the user, to generate a learning history including information associated with the question and the correct answer rate,
wherein the score indicating the degree of emphasis of the keyword calculates the score which becomes lower as the correct answer rate increases, in accordance with the learning history.

5. The apparatus according to claim 4, wherein the processor is further programmed to
estimate an attribute of the keyword,
wherein the giving of the question relating to the keyword to the user converts a first character string indicating the keyword into a second character string indicating the attribute, and
wherein the generated synthesized speech obtained by synthesizing speech of the keyword synthesizes speech of the second character string.

6. A speech learning method comprising:
detecting a keyword corresponding to a character string selected from text from a text acquisition unit comprising a stylus or a keyboard;
calculating a score indicating a degree of emphasis of the keyword based on a manner of selecting the keyword;
generating a synthesis parameter to determine a degree of reading of the keyword in accordance with the score;
adding to the keyword a tag for reading the keyword in accordance with the synthesis parameter;
generating synthesized speech obtained by synthesizing speech of the keyword in accordance with the tag;
calculating a social score indicating a score of the keyword selected by one or more other users different from the user; and
calculating an integration score using the score and the social score,
wherein the generating the synthesis parameter generates the synthesis parameter in accordance with the integration score.

7. A non-transitory computer readable medium including computer executable instructions, wherein the instructions, when executed by a processor, cause the processor to perform a method comprising:
detecting a keyword corresponding to a character string selected from text;
calculating a score indicating a degree of emphasis of the keyword based on a manner of selecting the keyword;
generating a synthesis parameter to determine a degree of reading of the keyword in accordance with the score;
adding to the keyword a tag for reading the keyword in accordance with the synthesis parameter;
generating synthesized speech obtained by synthesizing speech of the keyword in accordance with the tag;
calculating a social score indicating a score of the keyword selected by one or more other users different from the user; and
calculating an integration score using the score and the social score,
wherein the generating the synthesis parameter generates the synthesis parameter in accordance with the integration score.

* * * * *